United States Patent
Dabney et al.

(10) Patent No.: US 7,280,241 B2
(45) Date of Patent: Oct. 9, 2007

(54) PRINT DRIVER USER INTERFACE

(75) Inventors: Erika C. Dabney, Rochester, NY (US); Gary M. Davis, Rochester, NY (US); Sarah E. Campbell, Rochester, NY (US); Alan K. Robertson, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 983 days.

(21) Appl. No.: 09/944,581

(22) Filed: Sep. 4, 2001

(65) Prior Publication Data

US 2003/0043398 A1    Mar. 6, 2003

(51) Int. Cl.
*G06F 3/12*    (2006.01)
*G06F 15/00*   (2006.01)
*G06K 1/00*    (2006.01)

(52) U.S. Cl. ............ 358/1.15; 715/100; 715/705; 715/700; 715/710; 719/321

(58) Field of Classification Search ........ 715/700–866; 358/1.15; 719/321
See application file for complete search history.

(56) References Cited

U.S. PATENT DOCUMENTS

| | | | | |
|---|---|---|---|---|
| 5,164,842 A | * | 11/1992 | Gauronski et al. | 358/401 |
| 5,442,687 A | * | 8/1995 | Miller | 379/100.01 |
| 5,579,446 A | * | 11/1996 | Naik et al. | 358/1.9 |
| 5,706,411 A | | 1/1998 | McCormick et al. | 395/113 |
| 5,825,355 A | * | 10/1998 | Palmer et al. | 715/712 |
| 5,923,826 A | | 7/1999 | Grzenda et al. | 395/114 |
| 5,982,996 A | | 11/1999 | Snyders | 395/114 |
| 5,995,723 A | | 11/1999 | Sperry et al. | 395/114 |
| 6,028,604 A | | 2/2000 | Matthews et al. | 345/352 |
| 6,104,498 A | * | 8/2000 | Shima et al. | 358/1.14 |
| 6,134,019 A | | 10/2000 | Wantuck et al. | 358/1.15 |
| 6,151,426 A | | 11/2000 | Lee et al. | 382/305 |
| 6,278,450 B1 | | 8/2001 | Arcuri et al. | 345/334 |
| 6,565,608 B1 | * | 5/2003 | Fein et al. | 715/501.1 |
| 6,676,309 B2 | * | 1/2004 | Shima | 400/61 |
| 6,762,852 B1 | * | 7/2004 | Fischer | 358/1.15 |

OTHER PUBLICATIONS

McComb et al, Using WordPerfect 6.1 for Windows, 1994, pp. 290, 301-302.*
Microsoft Word 2000 (9.0.8926 SP-3) Copyright 1983-1999 Microsoft Corporation.*

* cited by examiner

*Primary Examiner*—Twyler Lamb
*Assistant Examiner*—Yixing Qin
(74) *Attorney, Agent, or Firm*—Joseph M. Young

(57) ABSTRACT

A print driver user interface method for printing copies of a document, which includes receiving a number corresponding to the number of copies to be printed from an application, receiving at least one command relating to an operation to be performed on each of the number of copies to be printed, and displaying a first feature to a user informing the user that the application may have a problem printing multiple copies. The method also includes offering the user a choice relating to printing copies of the document and transferring control of printing the copies from the application to the print driver.

7 Claims, 6 Drawing Sheets

PRINT DRIVER USER INTERFACE

BACKGROUND OF THE INVENTION

The present invention relates generally to user interfaces for document-processing devices, such as copiers, printers, scanners, and the like, and more specifically to a user interface that provides assistance to solve a user's multiple set printing problems.

The continued evolution of office document machines, such as copiers, printers, facsimile machines, and scanners, has resulted in highly sophisticated and function-rich machines. Typical selectable functions, such as for a copier, include making darker or lighter copies, selecting a number of copies, selecting from a number of alternate paper sizes, selecting stapled copies, copying on one or both sides of a paper sheet from one or both sides of an original, and image reduction or enlargement. Substantial efforts have been devoted to the design and layout of such machines to enhance an operator's understanding and reduce the possibility of operator entry errors. In a distributed, network oriented document management system, such as including one or redistributed printers, scanners, facsimile devices, and the like, such complicated functions may be selected via a "window" on a standard personal computer screen. Regardless of the particular interface used to control one or more document machines, there is still a premium to be placed on avoiding operator confusion.

As office equipment becomes increasingly a matter of interaction between networked peripherals, it is more common to have the users make their selections via a personal computer. However, some popular software applications cause problems for the customer when the customer attempts to print multiple sets of documents where the customer or someone else has selected certain operations to be performed on the documents. These operations may include duplexing or stapling. He or she may find that the first page of one set is often printed on the back of the last page of the previous set or that all the sets are stapled together as one huge document. In addition, the job can take an inordinate amount of time to spool and to print. This occurs because there is no break between the sets. The root cause of the problem is that some popular software applications render all pages of all sets themselves rather than rendering one set and allowing the printer to efficiently produce the duplicate sets.

SUMMARY OF EMBODIMENTS OF THE INVENTION

Embodiments of the present invention relate to a print driver user interface (UI) method for printing copies of a document, which includes receiving a number corresponding to the number of copies to be printed from an application, receiving at least one command relating to an operation to be performed on each of the number of copies to be printed, and displaying a first feature to a user informing the user that the application may have a problem printing multiple copies. Embodiments also include offering the user a choice relating to printing copies of the document and transferring control of printing the copies from the application to the print driver.

BRIEF DESCRIPTION OF THE DRAWINGS

The invention will be described in detail herein with reference to the following figures in which like reference numerals denote like elements and wherein.

While the present invention will be described in connection with exemplary embodiments thereof, it will be understood that the description of the exemplary embodiments are not intended to limit the invention to those embodiments. On the contrary, the following description is intended to encompass all alternatives, modifications, and equivalents as may be included within the spirit and scope of the invention as illustrated by the appended claims.

DETAILED DESCRIPTION OF PREFERRED EMBODIMENTS

Figure 1:
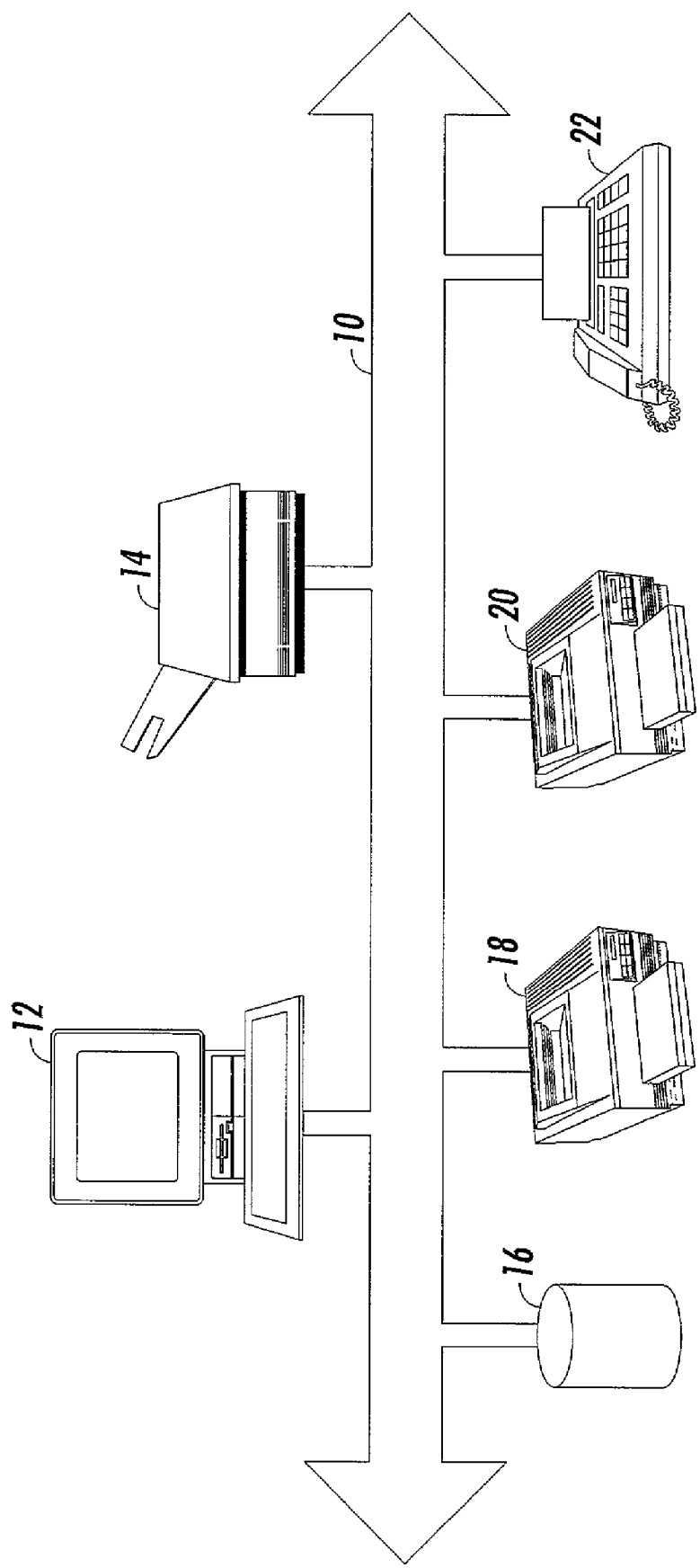
FIG. 1 is simplified diagram showing a networked document services system in which the present invention is useful.

FIG. 1 is a simplified diagram showing an example of a networked document-services system in which the present invention is useful. A network bus 10, which may be of any type known in the art, such as Ethernet or Token-Ring, interconnects a number of computers and peripherals. For example, on network 10 there would be typically any number of personal computers such as 12, scanners such as 14, shared memories such as 16, and of course printers such as 18 and 20. The network 10 may further interconnect a fax machine 22, which in turn connects with a standard telephone network. What is important is that the various computers and peripherals can interact to perform various document services.

Figure 2:
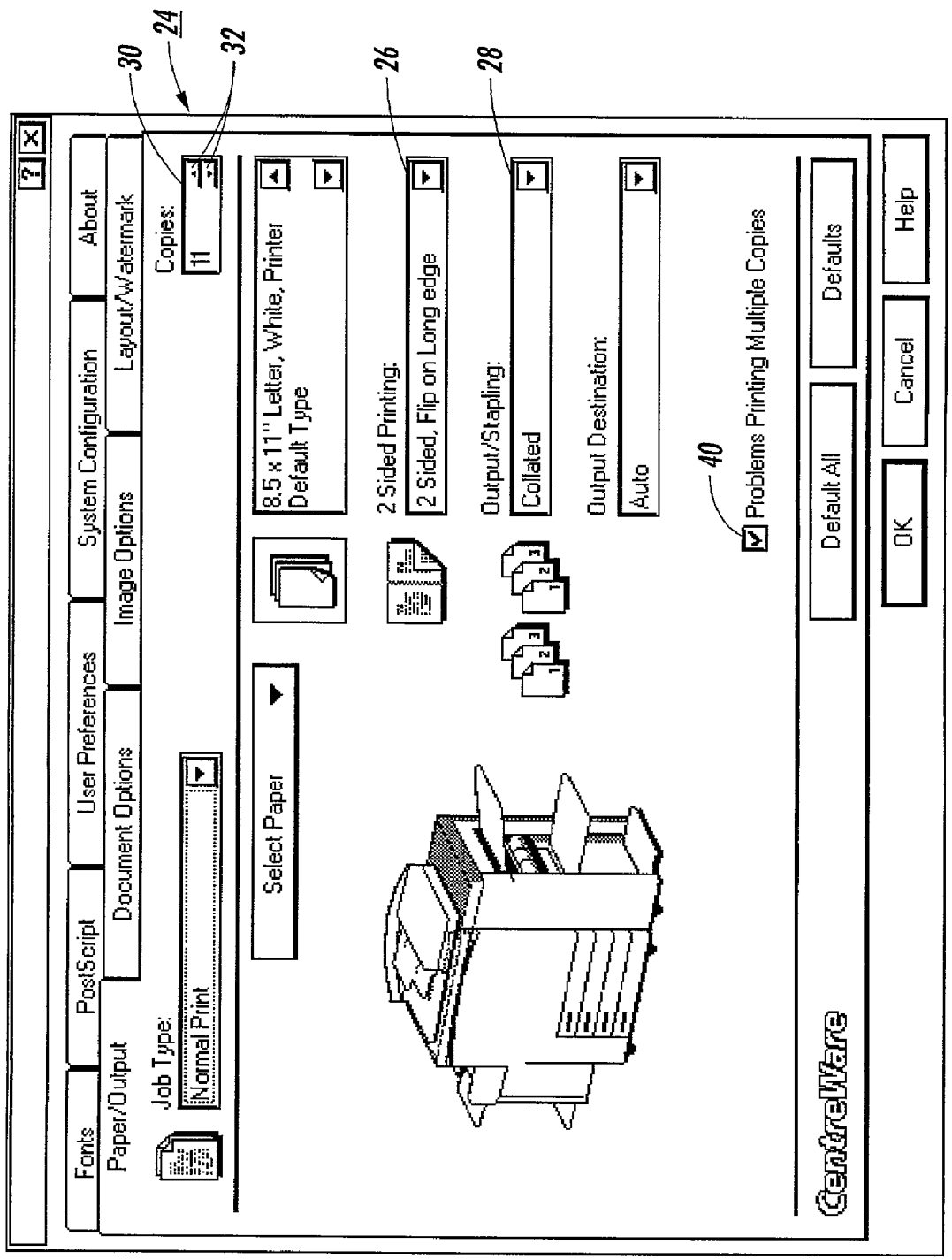
FIG. 2 is an example of a window in a graphical UI of a print driver.

FIG. 2 illustrates a graphical user interface (GUI) which can be displayed on a screen of the computer 12. The window shown in FIG. 2 is an example of a screen 24 of a GUI associated with a printing device that would be used in a networked document services environment. Of course, an equivalent of the screen 24 shown in FIG. 2 could be displayed directly on, for example, a digital copier. The GUI of FIG. 2 displays to the user a varied set of features, of which the printer or copier being controlled is capable.

In embodiments, many features are displayed in the form of pull-down menus, and pulling down any pull-down menu will display to the user a list of options associated with that feature. These options, when selected, designate certain operations to be performed when printing the copies. For example, the user will typically be offered the choice of printing one or two sided copies. The embodiment shown in FIG. 2 displays a pull-down menu 26 under the heading "2 sided printing," under which the user has the option of selecting one of the following options: 1 sided (typically the default choice), 2 sided, flip on the long side, or 2 sided flip on the short side. The embodiment shown in FIG. 2 also gives the user a choice from among the following options shown under an "output/stapling" pull-down menu 28:

uncollated, collated (typically the default choice), collated one staple, and collated two staples. In neither case should the list of options listed here be considered limiting. Under stapling, other options could be displayed such as long edge staple, short edge staple, booklet staple, etc. For purposes of the claims, what is important is that the general "feature" is displayed at a given time, whether or not all of the individual options within the feature can be displayed at a particular time.

In many situations, the print driver will offer the user the opportunity to print multiple copies. Screen 24 includes a window 30 labeled "Copies." The user may type the number of copies desired in the window, or the user may use the arrows 32 to the right of window 30 to increase or decrease the number of copies.

Figure 3:
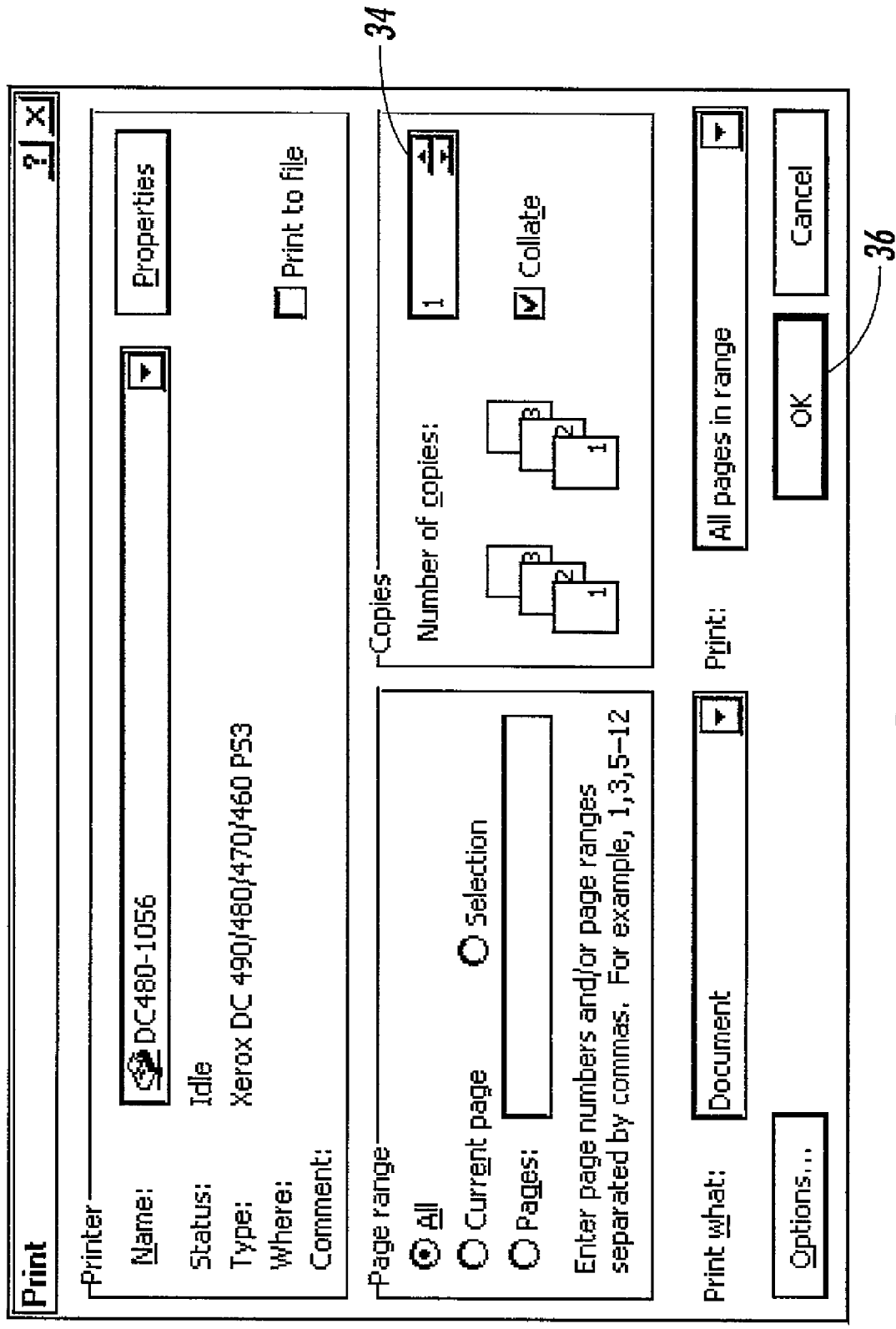
FIG. 3 is an example of an application interface.
Figure 4:
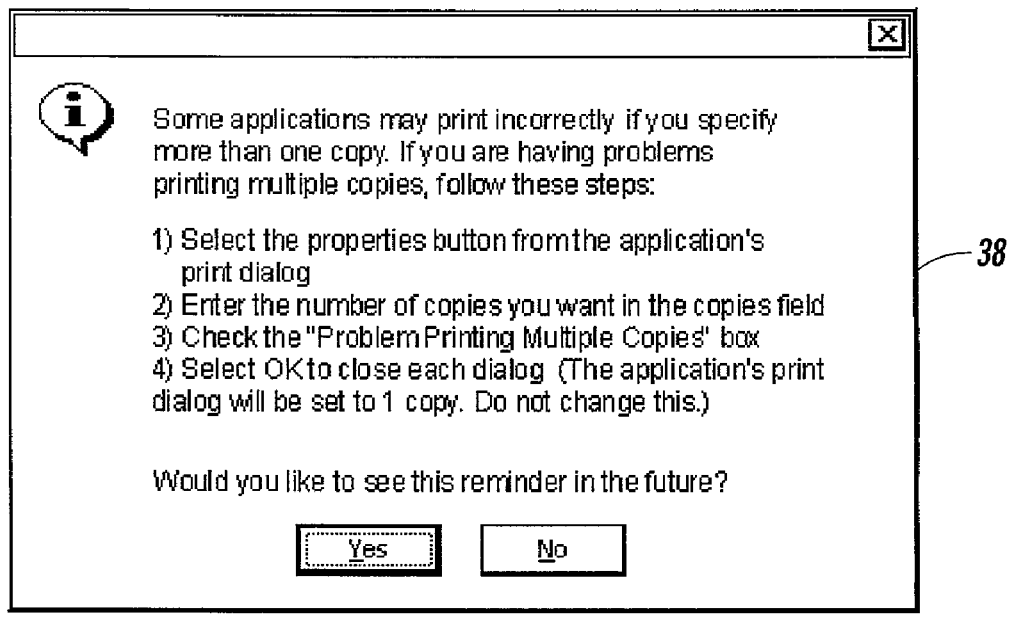
FIG. 4 is an example of a first feature generated by a print driver.

FIG. 3 is an example of an application interface. Many applications allow the user to select the number of copies. In FIG. 3, the user may enter the number of copies in window 34, labeled "Copies." When the user clicks on the OK button 36 on the UI of the application, the user's selections are sent to the print driver. If an operation such as two-sided printing (duplexing) or stapling has already been selected, and the user selects multiple copies, the print driver will cause information to be displayed on the screen. In embodiments, a feature will appear with this information. In embodiments, the feature takes the form of a window or box 38, such as that shown in FIG. 4. The box 38 informs the user that he or she needs to go into the print driver to turn on the control that allows the driver to generate the number of copies rather than the application. The box 38 explains to the user how to access the print driver's graphical user GUI if he or she desires. The message in the box 38 also informs the user that the application's print dialog will be set to one copy and informs the user not to change this number. The language used inside the box 38 in FIG. 4 is meant to be an example of how the information can be presented to the user, and, of course, any language conveying a similar meaning may be used.

The message included in box 38 is necessary because not all customers know how to access the print driver's UI. However, operations available in the print driver may still be activated. The seller or the buyer may preset printing parameters on the printer before it is used. For instance, to save paper costs, the purchaser may want duplexing to be the default mode of printing. The seller can alter the settings before the printer is shipped to the buyer, or the buyer may alter the settings before the printer is used. While not included in the interface disclosed in FIG. 3, some application software may also allow the user to select operations such as stapling or duplexing directly in the application. In either case, operations that may lead to a problem with some applications may be selected and the user may want to change the settings for a particular print job and need prompting to do so.

Figure 6:
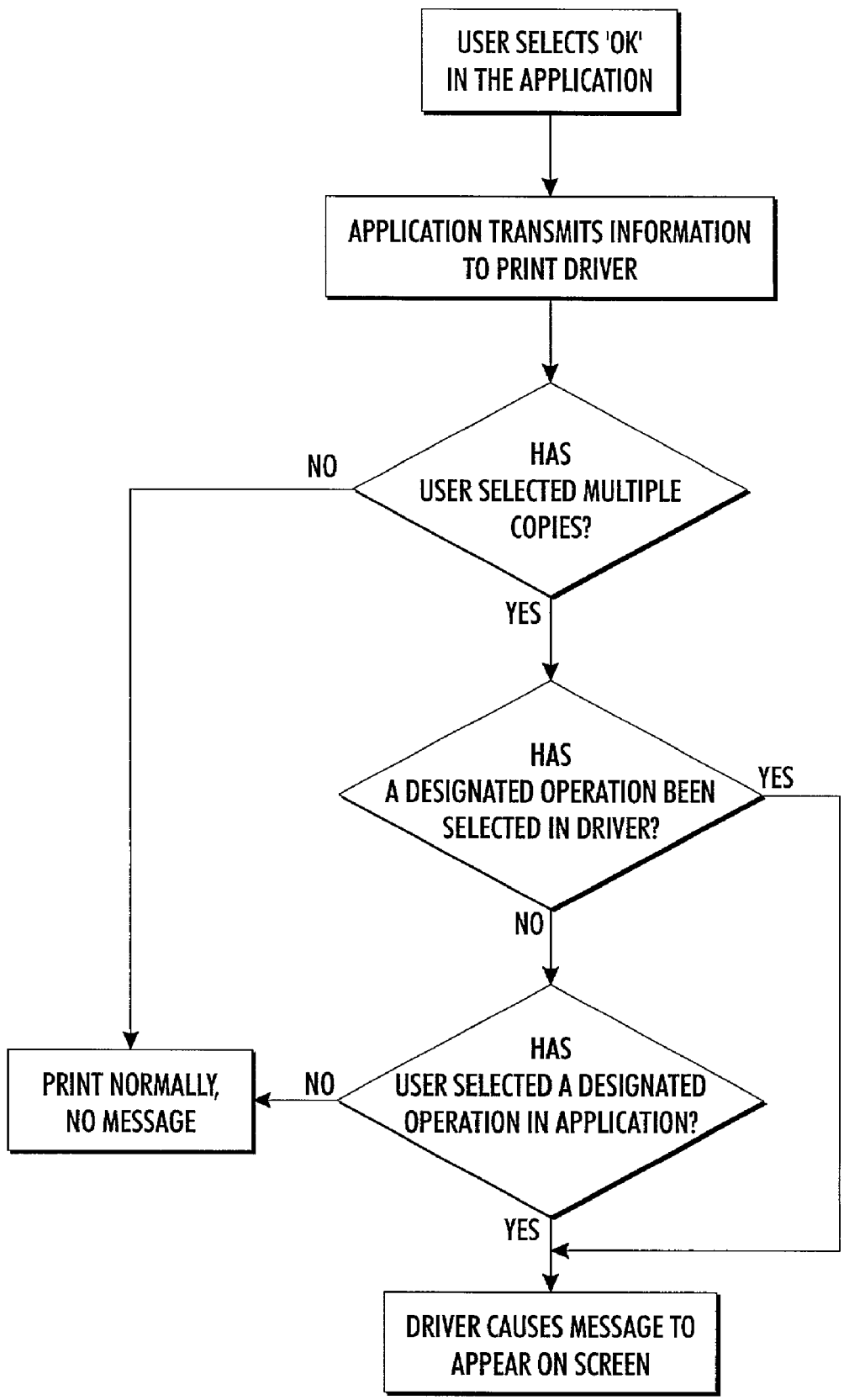
FIG. 6 is a flow chart illustrating the steps leading to the generation of the first feature.

FIG. 6 summarizes the process that occurs in embodiments when a user prints multiple documents with certain operations selected (either by the user or preselected in the print driver). First, the user selects OK in the application interface. The application then transmits the user-selected details of the print job to the print driver. The print driver receives the parameters from the application. The print driver then determines whether certain designated operations such as stapling or duplexing have been selected. If the print driver determines that one or more of these designated operations have been selected in the print driver, the print driver moves on to determining whether the user has selected multiple copies. If none of the designated operations have been selected in the print driver then the print driver determines whether the user has selected one of the operations in the application. If the user has not selected one of the operations in the application then the print job finishes normally. If the user has selected an operation such as stapling or duplexing, the print driver moves on to determining whether the user has selected multiple copies. If the user has selected multiple copies, then the print driver causes the message shown in box 38 to appear on the screen.

The user may choose to simply permit the print job to continue then determine if it is printing satisfactorily. When the print job is improperly generated or when the user suspects that a print job will print improperly, then the user can follow the directions and access the print driver GUI.

Returning attention to FIG. 2, when the user accesses the print driver interface, he or she will enter the number of copies in the copies window 30. The user will also see a checkbox 40 that will allow him or her to turn on the feature that allows the driver to generate the number of copies. In FIG. 2, this box 40 is labeled "Problem Printing Multiple Copies." This is part of a new driver feature that ensures that multiple sets are generated at the printer instead of by the application. This new feature might also be labeled something like "Print Multiple Times".

The user then enters the number of copies he or she wants made into box 30 and clicks OK on the print driver screen. This causes a couple of events to happen. The print driver assumes control of the print job and sends a message to the application that only one copy of the print job is being made. The print driver passes the customer-entered value directly to the printer device using the standard mechanisms provided in printer control languages such as, but not limited to, PCL and Adobe® PostScript™ in order to instruct the device to print the given job n-times rather than simply once.

Figure 5:
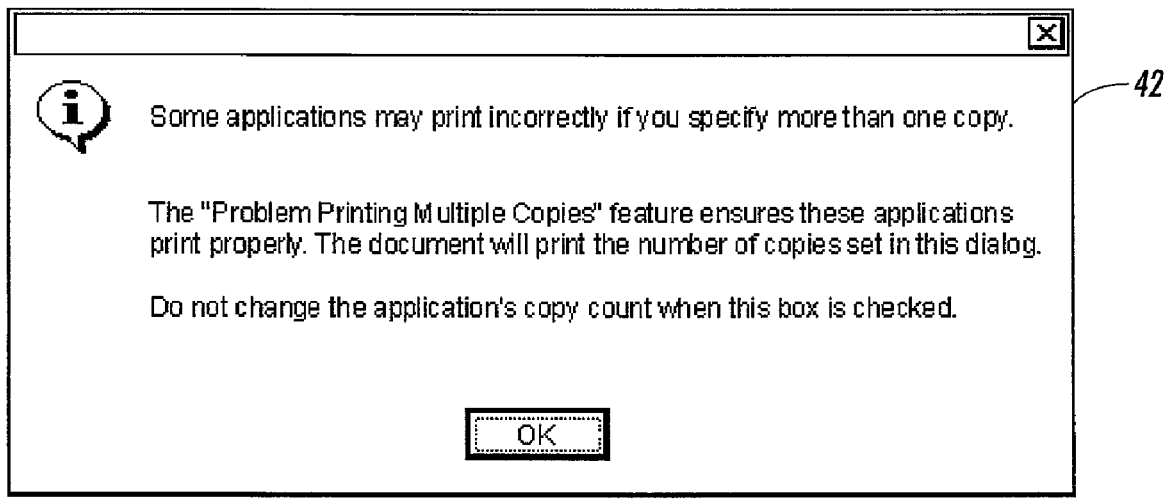
FIG. 5 is an example of a second feature generated by a print driver.

After the user presses the OK button, another message box 42 will appear telling the user the purpose of the feature and that the problem is an application problem and not a Xerox problem. See FIG. 5. The box 42 also reminds the user that he or she needs to enter the number of copies in the print driver. The language used inside the box 42 in FIG. 5 is meant to be an example of how the information can be presented to the user, and, of course, any language conveying a similar meaning may be used.

Figure 7:
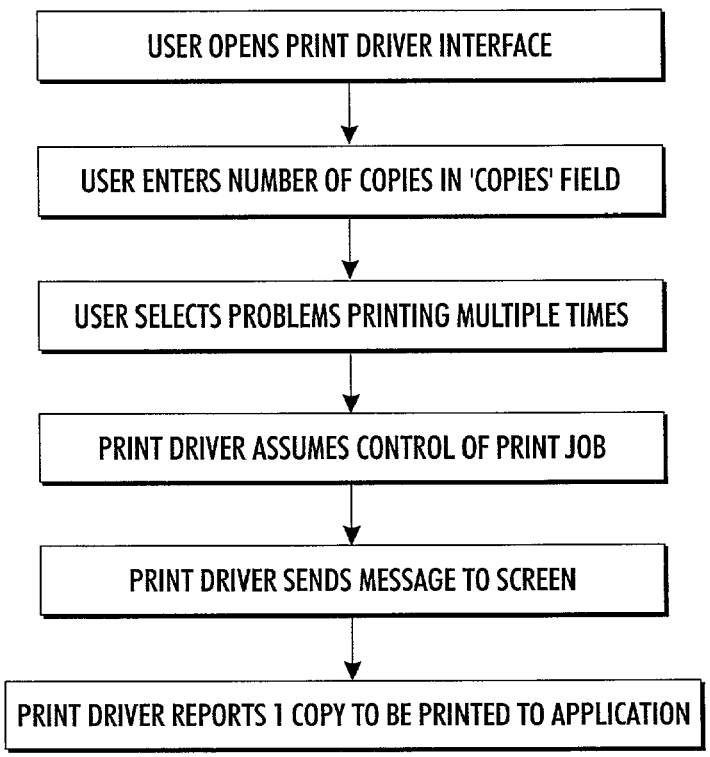
FIG. 7 is a flow chart illustrating the steps employed in implementing an embodiment of a process for transferring control of a print job from an application to a print driver.

FIG. 7 summarizes a process for setting multiple copies directly in the print driver. The user first opens the print driver UI. If the user follows the directions in box 38, he or she selects the properties button from the application's print dialog of the print driver's UI. This opens the print driver UI. The user enters the number of copies in the copies window 30 and checks the box 40 next to "Problems Printing Multiple Copies." The print driver then assumes control of the print job and informs the application that one copy is being made. The print driver also causes message box 42 to appear on the screen.

In embodiments, the print driver's UI could include a window captioned, for example, "Printing Multiple Times," in which the user enters the number of copies to be printed. Instead of checking one box and entering the number of copies in another, the user would only have to enter the number of copies in one box. The window would accept an input value of from 1 to some upper limit (ex. 9999). For this embodiment, the wording of the message in box 38 would be altered. Instead of stating "Enter the number of copies you want in the copies field" in step 2 and "Check the 'Problem Printing Multiple Copies' box" in step 3, in one step it could state, for example, "Enter the number of copies in the 'Print Multiple Times' window." The rest of the message could remain essentially unchanged.

"Print Multiple Times" usually does not notify either the operating system or the application of the value the customer enters for "Print Multiple Times". The default setting of "1" is left in the application's print window. The print driver passes the customer-entered value directly to the printer device using the standard mechanisms provided in printer control languages such as, but not limited to, PCL and PostScript in order to instruct the device to print the given job n-times rather than simply once.

Figure 8:
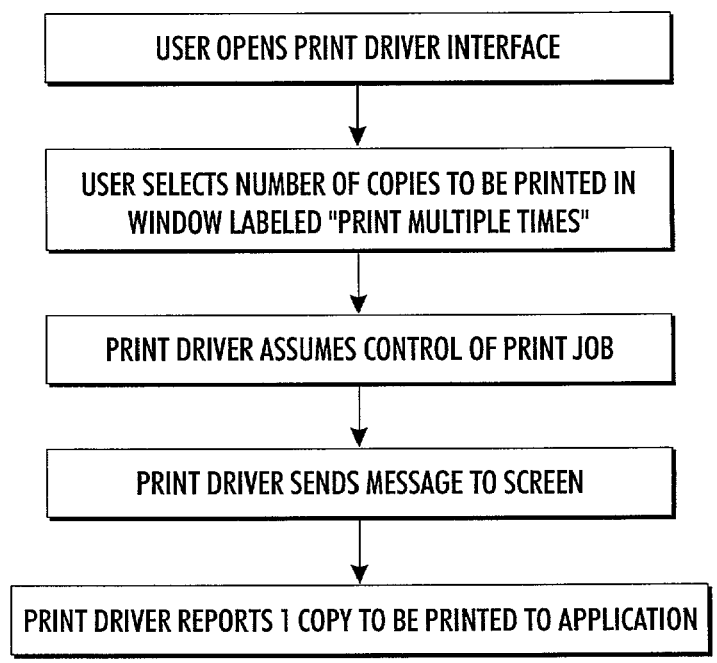
FIG. 8 is a flow chart illustrating the steps employed in implementing a second embodiment of a process for transferring control of a print job from an application to a print driver.

FIG. 8 summarizes another process for setting multiple copies directly in the print driver. FIG. 8 differs from FIG. 7 in that instead of separate steps for entering the number of copies and selecting that there is a problem printing multiple copies, there is only one step that combines both features. This corresponds to the fact that the UI of the print driver only has one window for printing multiple times, rather than a window for entering the number of copies and a box that needs to be checked to indicate a problem printing multiple copies.

To minimize the chance of accidental user error, such as a customer accidentally entering a number in both the copies field of the application and the relevant copies field of the print driver, the print driver can be set to (1) disable the relevant copies field in the UI and treat it as if it were set to 1, (2) display a warning message and ask the user to correct or confirm their choice, or (3) automatically reset the relevant copies field in the print driver to 1. If the print driver is not set for one of these options, the resulting number of sets produced would be the product of the value of the copies window of the application and the driver. For example, if each were set for 100 copies, then the resulting number of copies printed would be 10,000 (100×100=10000).

While this invention has been described in conjunction with various embodiments, it is believed that many alternatives, modifications, and variations will be apparent to those skilled in the art. Accordingly, it is intended to embrace all such alternatives, modifications, and variations as are incorporated within the spirit and broad scope of the appended claims.

What is claimed:

1. A print driver user interface method for printing a document, comprising at said print driver:

receiving a number corresponding to a plural number of copies of the document to be printed from a software application;

receiving at least one command relating to an operation to be performed on each of the plural number of copies of the document to be printed;

displaying a first feature to a user in response to receiving a plural number of copies of the document to be printed;

offering the user a choice to select to transfer control of printing the copies from the software application to the print driver;

transferring control of printing the number of copies from the software application to the print driver;

reporting to the software application that one copy will be printed, while proceeding to print the plural number of copies received from the software application.

2. A print driver UI method for printing multiple copies of a document, comprising at the print driver:

offering the user one or more choices relating to printing multiple copies of the document;

transferring control of printing the multiple copies from a software application to the print driver; and reporting to the software application that one copy of the document will be printed while printing multiple copies of the document.

3. The method of claim 2, wherein said offering includes offering the user the opportunity to reselect a number of copies to be printed.

4. The method of claim 3, wherein said offering includes offering the user the opportunity to select to transfer control of printing the copies from the software application to the print driver when multiple copies has been selected.

5. The method of claim 4, wherein offering the user the opportunity to select to transfer control includes offering the user to select there is a problem printing multiple copies.

6. The method of claim 2, further comprising displaying a feature to the user that explains the purpose and function of transferring control of printing the copies from the application to the print driver.

7. A print driver UI method for printing copies of a document, comprising at the print driver:

receiving a number corresponding to a plural number of copies of the document to be printed from a software application;

receiving at least one command relating to one of stapling or duplexing being performed on each of the plural number of copies to be printed;

displaying a first feature to a user that informs the user that the software application may have a problem printing multiple copies and instructs the user on how to access the print driver UI;

offering the user an opportunity to reselect the number of copies to be printed;

offering the user an opportunity to select there is a problem printing multiple copies transferring control of printing the copies from the software application to the print driver in response to a user selection;

displaying a second feature to the user that explains the purpose and function of transferring control of printing the copies from the software application to the print driver; and reporting to the software application that one copy will be printed.

* * * * *